United States Patent
Shorter

[19]

[11] Patent Number: 5,957,482
[45] Date of Patent: Sep. 28, 1999

[54] FOLDING CHILD'S WAGON

[76] Inventor: Thomas E. Shorter, 3939 Ashford St., San Diego, Calif. 92111

[21] Appl. No.: 08/707,210

[22] Filed: Aug. 30, 1996

[51] Int. Cl.[6] ...................................................... B62B 3/02
[52] U.S. Cl. ...................... 280/639; 280/87.01; 280/47.35
[58] Field of Search .................................... 280/7.15, 7.17, 280/639, 42, 651, 654, 656, 87.01, 87.021, 87.043, 87.05, 47.35, 47.34, 79.2, 79.3, 640, 32.6; 108/47; 301/111

[56] References Cited

U.S. PATENT DOCUMENTS

| | | | |
|---|---|---|---|
| 781,243 | 1/1905 | Thompson | 280/651 |
| 1,174,755 | 3/1916 | Mullen | 108/47 |
| 1,302,301 | 4/1919 | Broome | 280/32.6 |
| 1,378,023 | 5/1921 | Hachmann | 280/87.05 |
| 1,672,553 | 6/1928 | Archer | 280/87.01 |
| 2,080,709 | 5/1937 | Hall et al. | 280/639 |
| 2,682,438 | 6/1954 | Davis | 108/47 |
| 3,116,935 | 1/1964 | Mitchin et al. | 280/87.01 |
| 3,220,773 | 11/1965 | Burns | 280/79.2 |
| 3,305,243 | 2/1967 | Manfredi, Jr. et al. | 280/651 |
| 3,318,612 | 5/1967 | Kuhn | 280/87.01 |
| 3,992,034 | 11/1976 | Smith, Sr. et al. | 280/654 |
| 4,458,907 | 7/1984 | Meredith | 280/87.05 |
| 4,580,799 | 4/1986 | Quinonez | 280/639 |
| 4,744,575 | 5/1988 | Tonelli | 280/87.01 |
| 4,895,380 | 1/1990 | Brooks et al. | 280/32.6 |
| 4,958,843 | 9/1990 | Cole | 280/87.043 |
| 5,188,389 | 2/1993 | Baechler et al. | 301/111 |
| 5,232,233 | 8/1993 | Jedora | 301/111 |
| 5,261,681 | 11/1993 | Goldmeier | 280/47.34 |
| 5,299,826 | 4/1994 | Flowers | 280/656 |
| 5,536,034 | 7/1996 | Miller | 280/654 |
| 5,653,457 | 8/1997 | Marmer et al. | 280/47.35 |
| 5,765,868 | 6/1998 | Ventrone et al. | 280/87.01 |

*Primary Examiner*—J. J. Swann
*Assistant Examiner*—Frank Vanaman
*Attorney, Agent, or Firm*—Frank D. Gilliam

[57] ABSTRACT

A child's wagon movable between a use position and a folded, compact, storage configuration. The wagon has a transversely divided bed so that the bed can be hinged for folding from a flat position for use to a position in which the two bed halves are in face-to-face contact for storage. The wagon can be securely latched in either of the use and storage positions. Removable rail modules are provided with extending pegs that fit in holes through the bed along the edges of the bed. In use, the rail modules are installed in the bed to provide sidewalls while in the folded position the rail modules are installed in the same holes in what was the bottom of the wagon. Wings may be provided that can be fastened to side rails to extend upwardly and outwardly of the wagon sides. The wheels and their mounting assemblies may be removable.

10 Claims, 3 Drawing Sheets

FOLDING CHILD'S WAGON

FIELD OF THE INVENTION

This invention relates in general to play wagons for use by children to carry toys, ride in and for other play activities and, more specifically, to a child's wagon that can be folded for ease of transportation in a vehicle, compact storage, etc.

BACKGROUND OF THE INVENTION

Conventional wagons for children are made from metal and/or wood and have a flat bed with a raised rim. Wheels on brackets are fastened to the underside of the bed, with front wheels connected to a forward extending handle and mounted for turning. These wagons are generally sturdy and can stand up to long use. However, they are large and difficult to transport in a car, particularly modern cars with relatively small trunks. Also, the overall volume occupied by these wagons make them difficult and space consuming to store.

Various flat-bed hand trucks, flat carts and the like have been split transversely and hinged to allow them to fold for storage, such as those disclosed by Thompson in U.S. Pat. No. 781,243 and by Cohen in U.S. Pat. No. 4,114,914. While effective for flat carts, such a hinge arrangement is not possible with children's wagons having a permanent upstanding rim around the bed.

Attempts have been made to fold a cart having side walls by folding the walls down over the bed or by placing the hinges at the upper edges of the side walls, as described by Greenberg in U.S. Pat. No. 4,957,306. Neither of these arrangements is fully effective, due to the added thickness of the folded rim and the only slight gain in compactness gained by folding around rim mounted hinges.

A cart with a removable rails and a bed into which leaves may be inserted to increase the bed surface are described by Flowers in U.S. Pat. No. 5,186,479. However, the sliding mechanism for receiving the extension leaf is complex and heavy and the leaves when removed must be separately stored or transported.

Thus, there is a continuing need for an improved child's wagon that is sturdy and attractive, that includes side and end rails for safety in conveying a child or packages, that is foldable into a compact package in a convenient and simple manner, that conveniently stores the rails in the folded configuration and minimizes the need to carry or store separate components.

SUMMARY OF THE INVENTION

The above-noted problems, and others, are overcome by the folding child's wagon of this invention, which basically comprises a front and a back bed panel, wheels mounted on the undersides of the panels, a hinge arrangement for allowing the upper sides of said panels to be pivoted from a coplanar, use, position to a storage position where the upper surfaces are in contact, latch systems for securing the panels in either the use or storage positions and a plurality of rail modules mountable on either the upper side in the use position or the under side in the storage position.

Preferably, a spaced pair of wheels are mounted on the back panel for rotation in a plane substantially parallel to the length of the wagon. At least one wheel is mounted on the front panel through a steering bracket that allows the wheel to pivot about a vertical axis for ease of steering the wagon. Preferably, a handle is mounted to the steering bracket so that the bracket and wheel sill turn in directions controlled by the handle.

Preferably, the rail modules are mounted on pegs extending beyond the rail modules and sized to fit in corresponding holes through the bed adjacent to edges of the bed. In use, the pegs are inserted into the holes from the upper bed surface to form a rim or wall around the bed. In the storage position, the pegs are inserted into the under surface of the folded bed to retain the rail modules by friction between pegs and hole walls. While normal friction between reasonably tight fitting pegs and holes is generally sufficient to hold them in place, any suitable high friction coating or layer may be provided on the pegs or in the holes, if desired.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
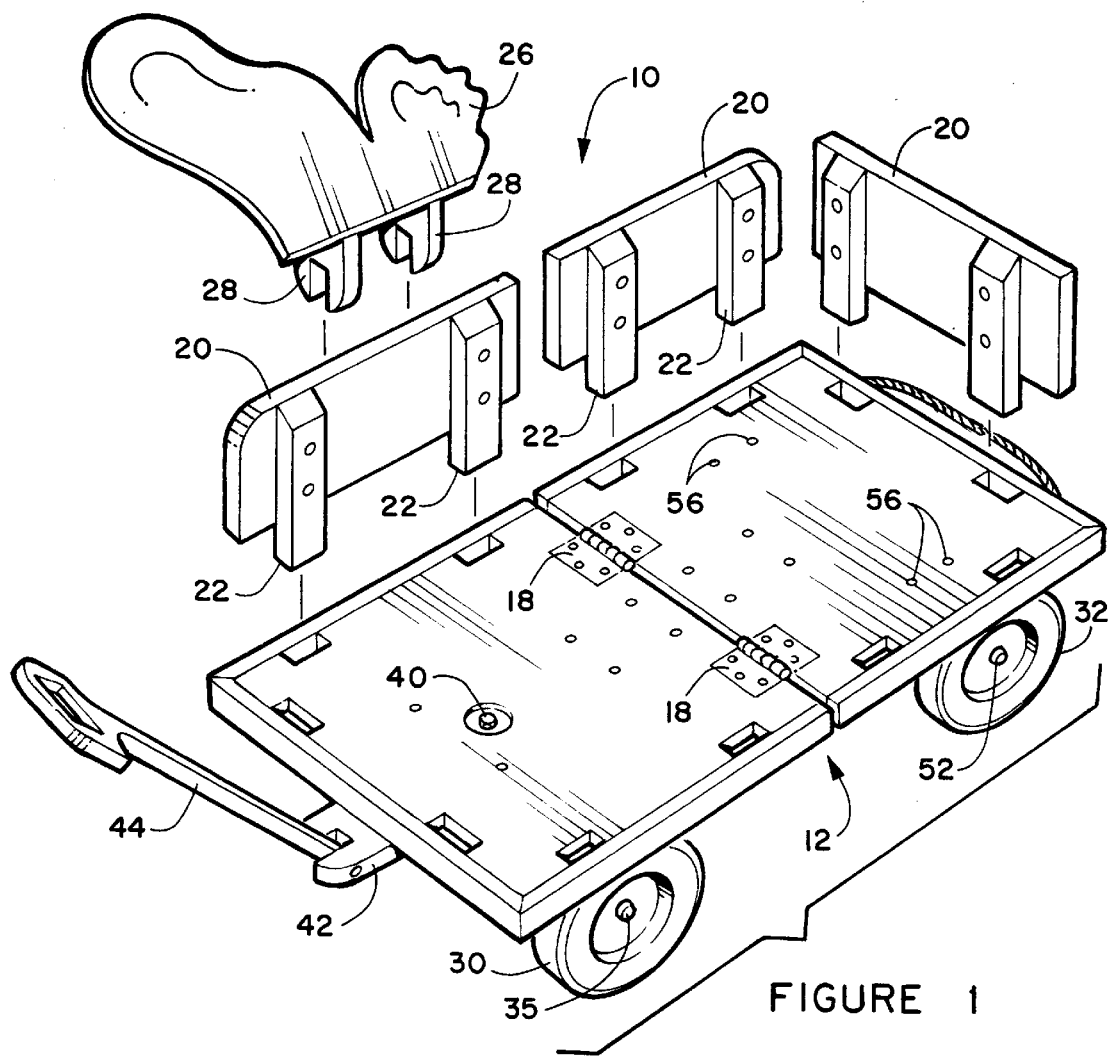
FIG. 1 is a perspective view of the wagon of this invention in the use position.

Referring generally to FIGS. 1–5, there is seen a child's wagon 10 according to this invention in the "ready for use" position, with some components shown in an exploded relationship for clarity.

Basically, the wagon includes a bed 12 made up of contiguous forward panel 14 and aft panel 16. A pair of hinges 18 extend across the interface between panels 14 and 16, so that the panels can fold around the hinge line. Blocks 17 are preferably provided on the undersides of panels 14 and 16 opposite hinges 18 so that longer screws can be used to secure hinges 18 to the bed. Alternately, carriage bolts could be used without blocks 17, with washers and nuts on the bolts on the underside.

In order to lock wagon 10 in the "in use" position illustrated in FIGS. 1–5, aligned hangers 19 are provided on the underside of forward panel 14 and aft panel 16. A bar 21 is slidable between a fastened position extending through all hangers 19 to an unfastened position extending, at most, though hangers on aft panel 16. While normal friction is generally sufficient to keep bar 21 in either position, if desired a higher friction material, such as a rubbery material, may be coated on one of the sliding surfaces of panel 16 or hangers 19 and bar 21.

Bed 12 may be formed from any suitable material. For optimum appearance, ease of forming and usefulness, wood is generally preferred. Typically, panels 14 and 16 are each a plywood sheet, framed in hardwood strips. If desired, bed could be formed from a metal, such as steel or aluminum, plastic (in particular a fiber reinforced plastic), etc.

A plurality of rail modules 20 are provided, each having at least two (preferably two) pegs 22 extending therefrom. Corresponding openings 24 are provided along all four sides of bed 12, corresponding in size and spacing to pegs 22. With all rail modules 20 in place, a nearly continuous rail or rim is provide around bed 12 to hold children, packages, etc. in place on the bed.

Wings 26, each mounted on at least two U-shaped brackets 28, may be provided, with brackets 28 sized to frictionally engage rail modules 20. Wings 26 are decorative and provide added security to children or packages in the wagon. Also, a passenger in the wagon can comfortably rest his or her elbow on a wing. Wings 26 may have any suitable configuration. Simple rectangular or semicircular sheets may be used, or an actual wing-like shape, such as a butterfly, airplane or missile wing may be used.

Figure 2:
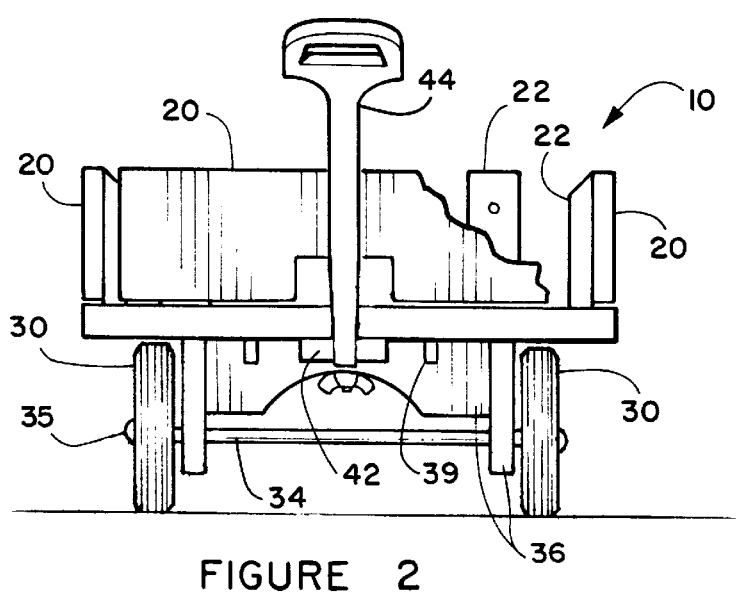
FIG. 2 is a front elevation view of the wagon.
Figure 3:
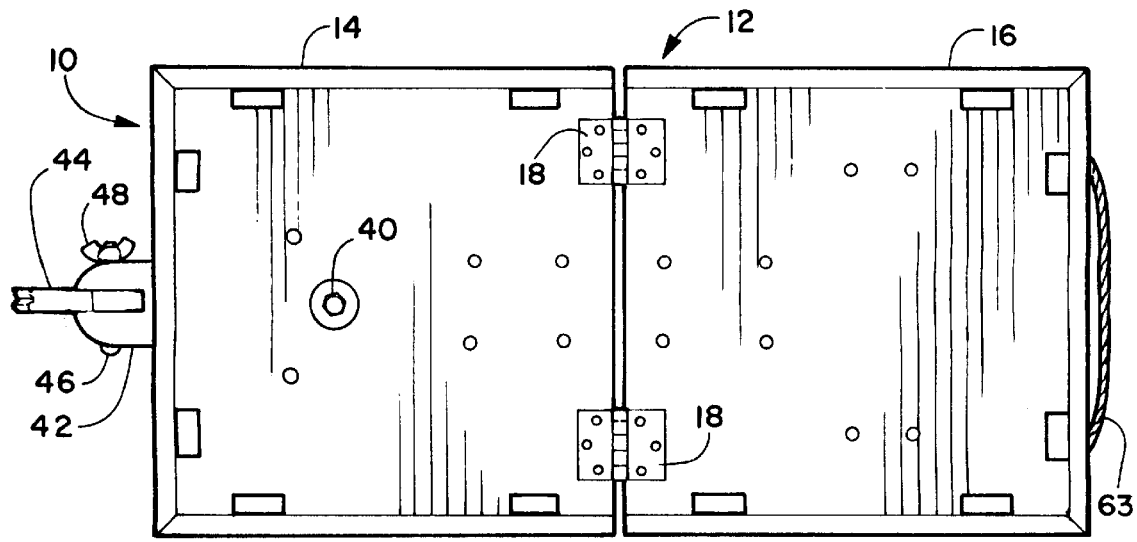
FIG. 3 is a plan view of the wagon.
Figure 4:
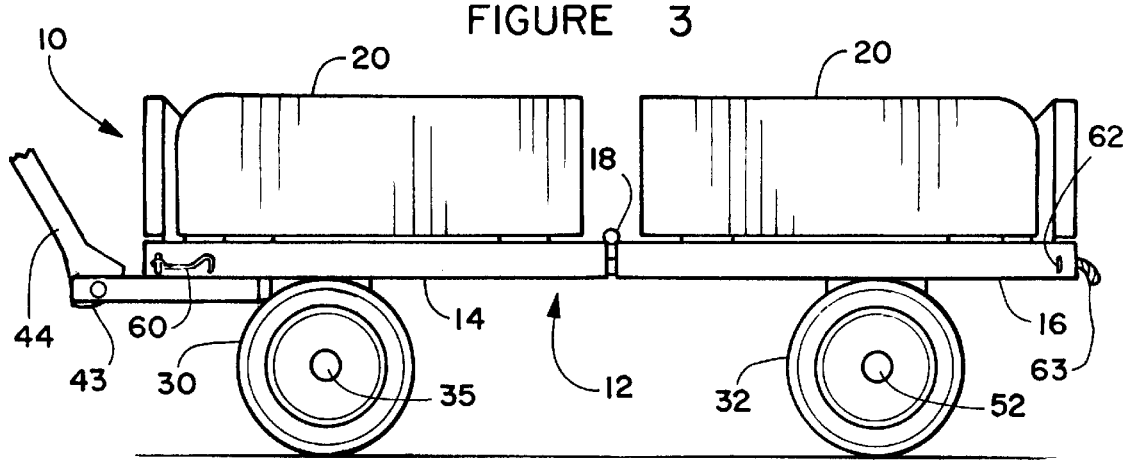
FIG. 4 is a side elevation view of the wagon.
Figure 5:
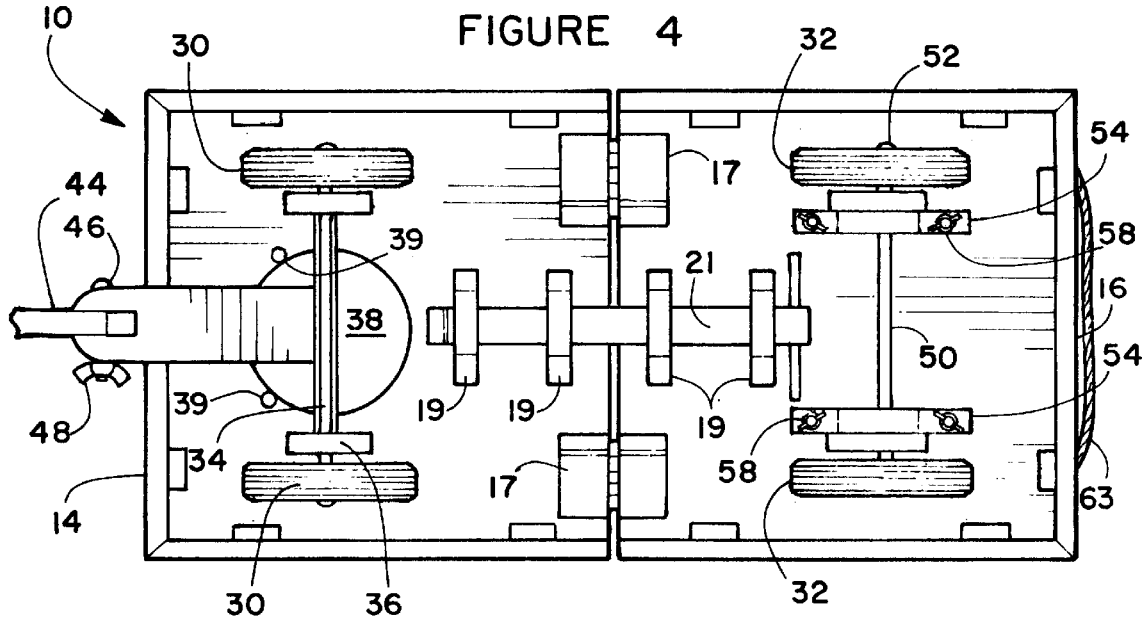
FIG. 5 is a view of the underside of the wagon.
Figure 6:
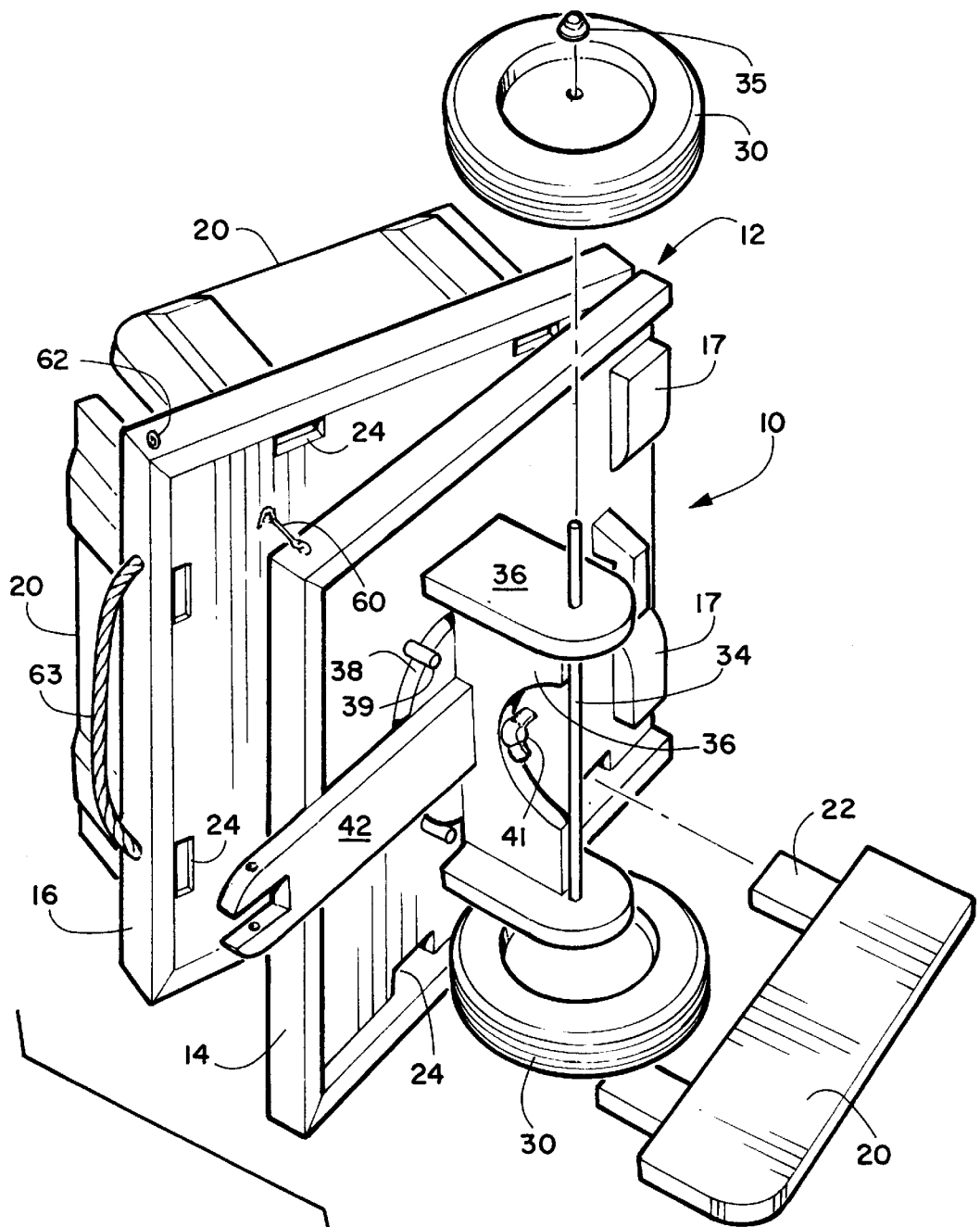
FIG. 6 is a perspective view of the wagon in the storage position.

As best seen in FIGS. 2, 5 and 6, front wheels 30 and back wheels 32 are mounted on the underside of panels 14 and 16, respectively. Front wheels are mounted on axle 34 by axle nuts 35 with the axle passing through mounting bracket 36 that includes a disk 38 rotatable about a bolt 40 shown in FIGS. 1 and 3. A wingnut may be provided on the end of bolt 40 for easy and convenient removal of bracket 36 and disk 38, if desired.

A handle support 42 is also secured to disk 38. Handle 44 is hingedly secured to support 42 by a bolt 46 and wingnut 48. Handle 44 can be easily removed for storage by manually removing bolt 46 and wingnut 48. Preferably handle 44 includes an arc shaped portion 45 closely spaced from the end of the notch in disk 38, to prevent a child's finger entering and being pinched in a space between the handle and the disk as the handle is moved upwardly. Also, two pins 39 are preferably mounted on the underside of the wagon to prevent handle 44 from being turned so far to the side to possibly tip the wagon over. Any other suitable handle arrangement may be used, as desired.

Back wheels 32 are mounted on axle 50 and secured thereto by axle nuts 52. Axle 50 is mounted in a pair of spaced brackets 54. A pair of carriage bolts 56 extend through aft panel 16 as best seen in FIG. 1 and through brackets 54 to wing nuts 58 as seen in FIG. 5. The rear wheel assembly of wheels 32, axle 50 and brackets 54 may be removed from the wagon for storage simply by manually removing wingnuts 58. Any other suitable permanent or easily removed mounting arrangement may be used for wheels 30 and 32, if desired.

FIG. 6 shows wagon 10 partially folded and nearly at the storage position. Rail modules 20 have been removed from the upper surface of bed 12 and a few are shown installed in the under side of the bed for easy carrying with the wagon bed. Handle 44 has been removed from support 42. If desired, the wheel brackets 36 for wheels 30 and brackets 54 for wheels 32 (not seen in FIG. 6) could be removed, if desired. When folding is complete hooks 60 are connected to eyes 62 to fasten wagon 10 in the storage position. While the hook and eye system shown is quick and convenient, any other suitable latching means may be used, if desired. In order to permit the wagon in the folded position to be easily carried, preferably a handle such as rope handle 63 is placed along an edge.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

I claim:

1. A child's wagon movable between a use position and a storage position, which comprises:

a bed comprising contiguous, substantially flat, forward and aft panels each having an upper surface and a lower surface;

a first pair of wheels mounted on said lower surface of said aft panel;

a second pair of wheels mounted on a flat member secured contiguous to said forward panel lower surface for rotation relative thereto;

a handle support member having a proximal end secured to said flat member and substantially coplanar therewith;

a handle pivotally secured to a distal end of said handle support member for pulling said wagon in the use position;

said handle support member extending forward of a forward end of said bed;

means mounted on said lower surface of said forward panel limiting rotation of said flat member to a predetermined arc;

hinge means between said forward and aft panel upper surfaces for permitting relative rotation of said panels between a substantially coplanar use position and a storage position with panel surfaces generally abutting;

first latch means for releasably latching said forward and aft panels in said use position;

said first latch means comprising a plurality of spaced, aligned, U-shaped hangers secured to said lower surfaces of each of said forward and aft panels and an elongated bar longitudinally slidable into and out of all of said hangers along said lower surfaces;

second latch means for releasably latching said forward and aft panels in said storage position;

a plurality of rail modules, each having at least two spaced pegs extending therefrom; and a plurality of holes through said forward and aft panels adjacent to edges of said forward and aft panels, said holes spaced and configured to receive said pegs through said upper surface for use and through said lower surface for storage.

2. The child's wagon according to claim 1 further including at least one wing, each said wing fastened to at least two U-shaped brackets, each open end of each said U-shaped bracket configured to fit over said rail modules with said wing at a predetermined angle to said rail to provide a decorative armrest for any passengers in said wagon.

3. The child's wagon according to claim 1 further including quick-release means for mounting and demounting said handle from said handle support member.

4. The child's wagon according to claim 1 further including a mounting bracket carrying said at least one wheel on said forward panel, means permitting pivoting of said mounting bracket about an axis substantially perpendicular to said forward panel said handle extending from said mounting bracket for pivoting said bracket whereby said wagon can be steered and pulled by said handle.

5. The child's wagon according to claim 1 further including a carrying handle secured to an aft end of said bed for carrying said wagon in said storage position.

6. The child's wagon according to claim 1 further including quick-release means for mounting and demounting said handle from a mounting bracket.

7. A child's wagon moveable between a use position and a storage position, which comprises:

a bed having a forward and aft end and comprising contiguous, substantially flat, forward and aft panels each having an upper surface and a lower surface;

a first pair of wheels mounted on said lower surface of said aft panel;

a second pair of wheels mounted on a flat member secured contiguous to said forward panel lower surface for rotation relative thereto;

a handle support member having a proximal end secured to said flat member and substantially coplanar therewith and a distal end extending forward of said bed forward end;

a pulling handle pivotally secured to said handle support member distal end for pulling said wagon in said use position;

means mounted on said lower surface of said forward panel limiting rotation of said flat member to a predetermined arc;

quick-release means for securing said flat member to said lower surfaces and for releasing said flat member and associated wheels therefrom;

hinge means between said forward and aft panels for permitting relative rotation of said panels between a substantially coplanar use position and a storage position with said forward and aft panel upper surfaces substantially in face-to-face contact;

first latch means for releasably latching said forward and aft panels in said use position;

said first latch means comprising at least four aligned U-shaped hangers with at least two hangers secured to said lower surfaces of each of said forward and aft panels and a bar slidable into and out of said hangers;

second latch means for releasably latching said forward and aft panels in said storage position;

a plurality of rail modules, each having at least two spaced pegs extending therefrom;

a plurality of holes through said forward and aft panels adjacent to edges of said forward and aft panels, said holes spaced and configured to receive said pegs;

at least one wing, each bearing at least one bifurcated bracket, said bifurcation configured to fit over a rail module with said wing extending at a predetermined angle to said rail module to provide an arm rest for any passenger in said wagon; and a carrying handle secured to an aft end of said bed for carrying said wagon in said storage position.

8. A method of assembling a child's wagon for use and then modifying said wagon for storage and transportation which comprises the steps of:

providing a wagon having a bed with wheels mounted on a first bed surface, said bed comprising substantially flat forward and aft panels abutting along a line with hinge means across said line, said bed having spaced holes therethrough adjacent to edges of said bed;

rotating said panels about said hinge to a coplanar arrangement;

latching said panels in said coplanar arrangement;

mounting rail modules for use by inserting pegs extending from said rail modules into said holes through a second bed surface opposite to said first surface;

using said wagon to transport things;

removing said rail modules;

unlatching said panels from said coplanar arrangement;

rotating said panels about said hinge to bring them into a face-to-face arrangement;

latching said panels in said face-to-face arrangement; and mounting said rail modules for storage by inserting said pegs into said holes through said first bed surface;

whereby a compact package for storage, transportation and later return to the use position is created.

9. The method according to claim 8 further including a final storage step of removing said wheels from said bed.

10. The method according to claim 8 including the steps of fastening wings to said rail modules after said rail modules have been inserted in said holes through said second surface so that said wings extend at a predetermined angle to said rail modules.

* * * * *